United States Patent
Bazzo

(10) Patent No.: US 11,247,373 B2
(45) Date of Patent: Feb. 15, 2022

(54) PROCESS AND APPARATUS FOR INJECTION MOLDING OF PLASTIC MATERIALS

(71) Applicant: INGLASS S.p.A., San Polo di Piave (IT)

(72) Inventor: Maurizio Bazzo, San Polo di Piave (IT)

(73) Assignee: INGLASS S.p.A.

( * ) Notice: Subject to any disclaimer, the term of this patent is extended or adjusted under 35 U.S.C. 154(b) by 0 days.

(21) Appl. No.: 16/624,934

(22) PCT Filed: May 13, 2019

(86) PCT No.: PCT/IB2019/053936
§ 371 (c)(1),
(2) Date: Dec. 20, 2019

(87) PCT Pub. No.: WO2019/229564
PCT Pub. Date: Dec. 5, 2019

(65) Prior Publication Data
US 2021/0069954 A1    Mar. 11, 2021

(30) Foreign Application Priority Data

May 31, 2018    (IT) .................... 102018000005902

(51) Int. Cl.
*B29C 45/28*    (2006.01)
*B29C 45/77*    (2006.01)

(52) U.S. Cl.
CPC .......... *B29C 45/2806* (2013.01); *B29C 45/77* (2013.01); *B29C 2945/76006* (2013.01);
(Continued)

(58) Field of Classification Search
CPC ................ B29C 45/2806; B29C 45/76; B29C 2045/2872
See application file for complete search history.

(56) References Cited

U.S. PATENT DOCUMENTS

| 2016/0167272 A1 | 6/2016 | Zigante et al. |
| 2018/0178465 A1 | 6/2018 | Chiba et al. |
| 2018/0281258 A1 | 10/2018 | Bazzo |

FOREIGN PATENT DOCUMENTS

| JP | 2012035428 A | 2/2012 |
| JP | 2013107212 A | 6/2013 |

(Continued)

OTHER PUBLICATIONS

"The new Flexflow—The turn key solution for your top quality applications". HRS Flow Hot Runner Technology, www.hrsflow.com. 6 pages.

(Continued)

*Primary Examiner* — James Sanders
(74) *Attorney, Agent, or Firm* — RMCK Law Group PLC

(57) ABSTRACT

A method for injection molding of plastic material by means of at least one injector whose pin valve can be displaced between a fully closed position and a maximum open position in a controlled fashion according to a position and speed of the pin valve. During displacement of the pin valve from the fully closed position to the maximum open position, and/or vice versa, the pin valve is stopped in intermediate positions and the displacement speed thereof is uniform and constant. An initial opening step at maximum speed and one or more steps of inversion of the motion of the pin valve can be provided for.

25 Claims, 7 Drawing Sheets

(52) U.S. Cl.
CPC ............... *B29C 2945/76545* (2013.01); *B29C 2945/76568* (2013.01); *B29C 2945/76859* (2013.01)

(56) References Cited

FOREIGN PATENT DOCUMENTS

| | | |
|---|---|---|
| JP | 2015039852 A | 3/2015 |
| JP | 2016135586 A | 7/2016 |
| WO | 2012074879 A1 | 6/2012 |
| WO | 2016081713 A1 | 5/2016 |

OTHER PUBLICATIONS

International Search Report dated Aug. 29, 2019. 15 pages.
Office Action dated Nov. 2, 2021 in connection with Japanese Patent Application No. 2021-016754 (5 pages).

PROCESS AND APPARATUS FOR INJECTION MOLDING OF PLASTIC MATERIALS

CROSS-REFERENCE TO RELATED APPLICATIONS

This application is a 371 National Stage of International Application No. PCT/IB2019/053936, filed May 13, 2019, which claims priority to Italian Patent Application No. 102018000005902 filed May 31, 2018. The disclosure of each of the above applications is incorporated herein by reference in its entirety.

FIELD OF THE INVENTION

The present invention refers to the injection molding of plastic materials and more in particular it regards a method for injection molding by means of an apparatus comprising a distributor of fluid plastic material under pressure connected to at least one injector including a pin valve displaceable between a fully closed position and a maximum open position and vice versa.

Typically, these injection molding methods comprise a step for filling the mold cavity with the plastic material following the displacement of the pin valve from the fully closed position to the maximum opening position, followed by a step of packing the plastic material injected under pressure into the cavity, whereby the pin valve is held in the maximum open position. The pin valve is then displaced from the maximum open position to the fully closed position and the molded detail is removed from the mold after a waiting period so as to allow the plastic material to solidify.

The displacements of the pin valve or each injector are conventionally carried out through a fluid actuator. Apparatus in which the pin valve is actuated by an electric actuator, for example rotary, have been proposed in more recent times.

STATE OF THE PRIOR ART

Both electric and fluid actuators are typically controlled utilising electronic systems which operate according to process parameters, detected by means of special sensors, and/or by means of specific algorithms. This allows to efficiently control both the position and the displacement speed of the pin valve between the closing position and the opening position so as to vary the flow of the plastic material injected during the molding cycle. Thus, documents WO-2012/074879A1 and WO-2012/087491A1 provide for controlling the actuator to displace the pin valve continuously from the closing position to the opening position at one or more so-called intermediate speeds and then at one or more speeds higher than the intermediate speed/s. Such control is carried out as a function of the time or of the space covered by the pin valve starting from the closed position thereof: a position sensor directly associated to the pin valve which transmits the signals thereof to the electronic control of the actuator is provided for in such case.

Document US-2015/266216A1 (U.S. Pat. No. 9,738, 016B2) in the name of the Applicant provides for a discontinuous displacement of the pin valve from the closing position to the opening position, with at least one step for stopping in a partial opening intermediate position. The displacement speed of the pin valve is not an issue.

Even document US-2016/167272A1 in the name of the Applicant provides for a discontinuous displacement of the pin valve, which—during the opening—is driven at a first speed, then stopped in at least one partial opening intermediate position and subsequently driven at at least one second speed higher than the first speed. Even the displacement of the pin valve from the maximum opening position to the fully closing position is discontinuous, i.e. it can provide for a step of temporary stop in a partial closing intermediate position, and the displacement speed from this partial closing position to the fully closing position is different, for example lower than the displacement speed of the pin valve from the maximum opening position to the partial closing intermediate position.

This type of control is difficult to correlate with the actual process conditions, i.e. a series of considerably variable parameters for example as a function of variation of the operating conditions and the physical state of the plastic material, and also the pressure of the plastic material supplied to the injector. This can create surface defects on the molded pieces.

Should the actuator that actuates the pin valve be of the electrical type and specifically of the electrical rotary type it is convenient, for simplicity purposes, to detect the position of the pin valve not directly but rather indirectly. In particular in the case of document EP-2679374A1 in the name of the Applicant the shaft of the rotary electric motor actuates the pin valve of the injector by means of a transmission which distinctively includes a nut and screw unit and an oscillating lever. The position of the pin valve is in this case conveniently detected by means of an encoder associated to the drive shaft and operatively connected to the electronic control thereof. Considering both the possible clearances present in the transmission kinematic chain and the possible drive effects of the pin valve by the injected material, the detection of the position of the pin valve during the opening and closing stroke indirectly carried out by means of the encoder would not be as precise as it would be desired for an accurate control of the position and speed of the pin valve.

A more accurate and precise control is particularly necessary for the injection molding of articles that require high quality both from a mechanical point of view and from an aesthetic point of view.

SUMMARY OF THE INVENTION

The object of the invention is to provide an efficient solution to the aforementioned technical problem, through a peculiar control of the injection process capable of allowing to be able to limit or entirely eliminate the aforementioned defects from the molded pieces.

With the aim of attaining this object, the invention is directed to an injection molding method of the type defined at the beginning, in which during the displacement from the fully closed position to the maximum open position the pin valve is stopped in a plurality of partial opening intermediate positions and the displacement speed of the pin valve between the stop positions is uniform and constant.

According to another aspect, the method according to the invention provides for that the pin valve be displaced at a uniform and constant speed even from the maximum open position towards the fully closed position, temporarily stopping in a plurality of partial closing intermediate positions.

The opening and closing constant and uniform speed can be programmed as a function of the characteristics of the injected plastic material and the articles to be molded, and the opening constant and uniform speed can be equal to or different from the closing constant and uniform speed.

The duration of the stop times of the pin valve can be constant or, more preferably, variable. In particular, during the opening displacement thereof, the stop times shorten progressively as the pin valve draws closer to the maximum opening position.

According to a further peculiar aspect of the invention, the opening displacement of the pin valve is not only discontinuous but it also provides for one or more steps for the temporary and quick return towards the closing position. The same mode can also be provided for in the closing displacement of the pin valve which, besides being discontinuous, may provide for one or more steps for the temporary and quick return towards the opening position. These steps can for example be provided for in proximity of an initial position and/or of an intermediate position and/or of a final position of the opening or closing stroke of the pin valve essentially with the aim calibrating and possibly compensating or correcting the signals regarding the indirect detection of the position of the pin valve transmitted by the encoder of the electric motor to the electronic control unit. In this manner, the pin valve speed control becomes considerably more accurate, to the advantage of the quality of the molded articles. It should be observed that these steps for inverting the ascending ("upstream") and/or the descending ("downstream") motion of the pin valve have always been considered inappropriate, if not unwanted, by those skilled in the art. Hence, besides attaining the aforementioned advantages the opposite solution thus proposed by the Applicant allows to clearly overcome a consolidated technical drawback.

According to a further characteristic of the invention the initial opening speed of the pin valve starting from the fully closing position can be conveniently different and more in particular greater than the aforementioned uniform and constant displacement speed, and thus be a maximum opening speed, until the pin valve stops in a first minimum partial opening position.

Thanks to the invention, the Applicant surprisingly found out that it is possible to obtain considerable effects in terms of improved aesthetic quality of the molded pieces particularly in case of molding apparatus with multiple injectors actuated in a sequence or cascade fashion.

The invention also regards an apparatus for implementing the injection molding method.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

The injection moulding apparatus subject of the invention is generally conventional and well-known to the man skilled in the art. It can for example be of the type described and illustrated in the previously mentioned document US-2015/266216A1 (U.S. Pat. No. 9,738,016B2) and comprise, in brief, a distributor of the molten plastic material or hot runner which supplies the plastic material to one or more injectors each comprising a nozzle movable in which is a pin valve that can be axially displaced, by means of an actuator, between an advanced fully closing position and a receded maximum opening position so as to allow the flow of the plastic material into the mold, and vice versa to close the flow. In case of multiple injectors, the molding cycle may provide for, in a known fashion, an injection of the sequential or cascade type.

The actuator that controls the displacements of the pin valve of the or of each injector can be of the fluid type (hydraulic or pneumatic) or of the electric type. An example of such electric actuator, of the rotary type, is described and illustrated in the prior art document EP-2679374A1 in the name of the Applicant, in which the electric drive shaft actuates the pin valve by means of a transmission including a nut and screw unit and an oscillating lever.

The actuator, whether of the electric or fluid type, is operatively connected to a programmable control electronic unit and configured to actuate the pin valve in a controlled fashion according to the position and displacement speed thereof. The control can be programmed as a function of operative parameters of the molding apparatus, such as for example the characteristics of the plastic material and those of the articles to be molded, the pressure of the plastic material injected into the cavity, and/or further pre-set parameters.

Figure 1:
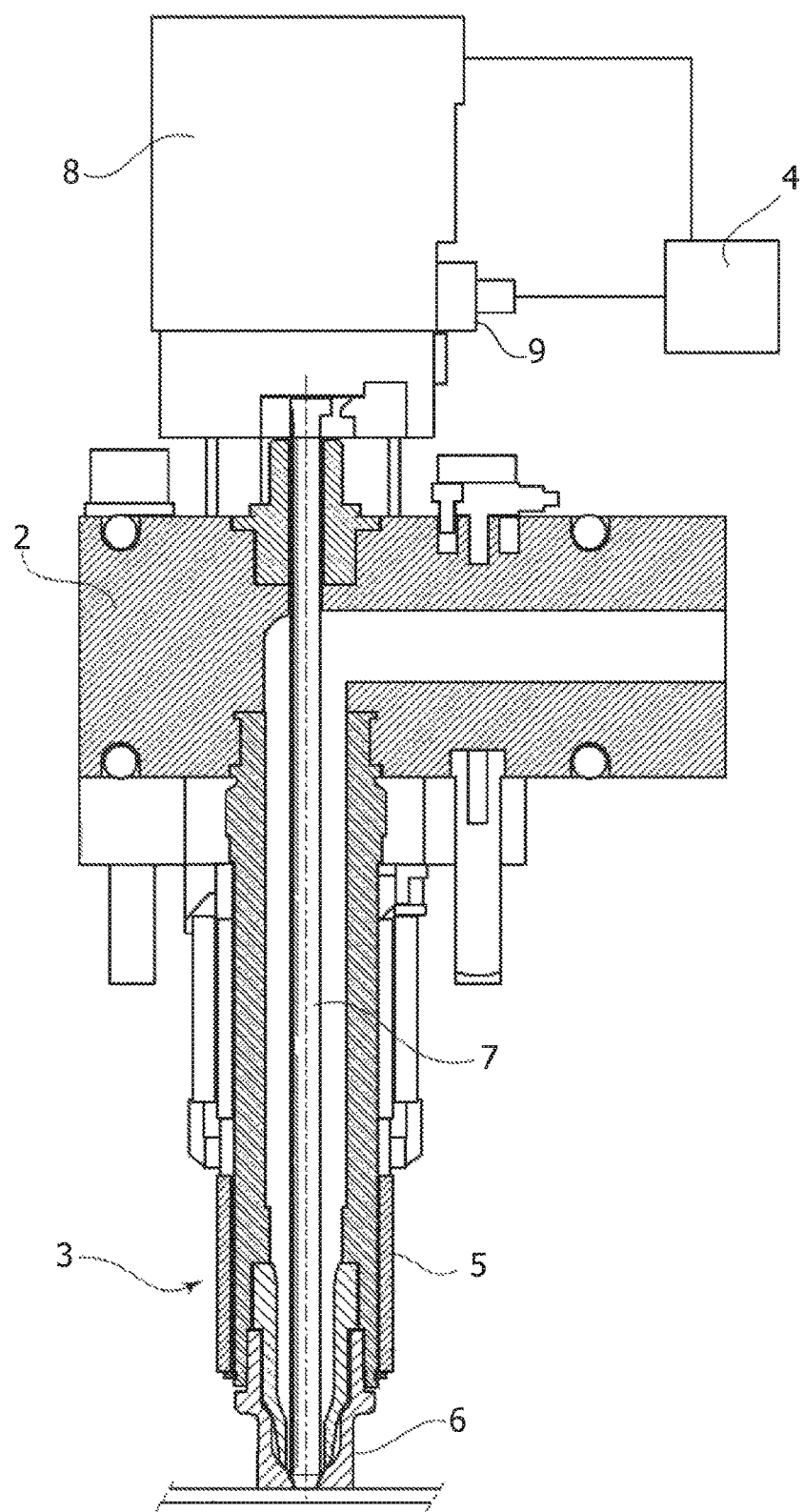
FIG. 1 is a partially cross-sectional schematic view showing an injector for an injection moulding apparatus according to the invention.

FIG. 1 schematically shows a molding apparatus thus made in which an injector 3, connected to a distributer of molten plastic material distributor or hot runner 2, comprises a nozzle 5 provided—at the free end thereof—with a nozzle terminal 6 placed in communication with the cavity of a mold by means of a gate. The flow of the plastic material through the nozzle terminal 6 is controlled by a pin valve 7 axially displaceable along the nozzle 5 by means of an actuator 8, between the lowered fully closing position represented in FIG. 1, and a raised maximum opening position.

The actuator 8 is in this case an electric actuator, and more in particular a rotary electric motor: the arrangement thereof illustrated in FIG. 1 is solely for indicative purposes, in that it can conveniently be of the type described and illustrated in the aforementioned document n° EP-2679374, according to which the shaft of rotary electric motor 8 is arranged transversely to the pin valve 7 and actuates it through a transmission (not illustrated) including a nut and screw unit and an oscillating lever. It should be observed that the invention also identically applies to other configurations, for example of the type in which the shaft of the electric motor is axially aligned with the pin valve 7.

The electric motor 8 is provided—in a known fashion—with an encoder 9 associated to the shaft thereof and suitable to indirectly detect the position of the pin valve 7. The encoder 9 is operatively connected to an electronic control unit 4 configured to actuate electric motor 8, and thus the pin valve 7, in a controlled fashion as a function of various parameters. In particular, the displacement speed of the pin valve 7 carried out by the electric motor 8 is carried out as a function of the position thereof detected by means of the encoder 9.

According to the distinctive characteristic of the invention, the programmable control provides for the discontinuous displacement of the pin valve and the stopping thereof in one or more intermediate positions between the fully closing and maximum opening, and/or vice versa, by setting an always uniform and constant speed during each step for displacing the pin valve in the opening stroke thereof and/or in the closing stroke thereof, unless as otherwise explained hereinafter. Such uniform and constant speed combined with the displacement pauses of the pin valve surprisingly allows to improve the aesthetic and structural qualities of the molded articles.

Figure 2:
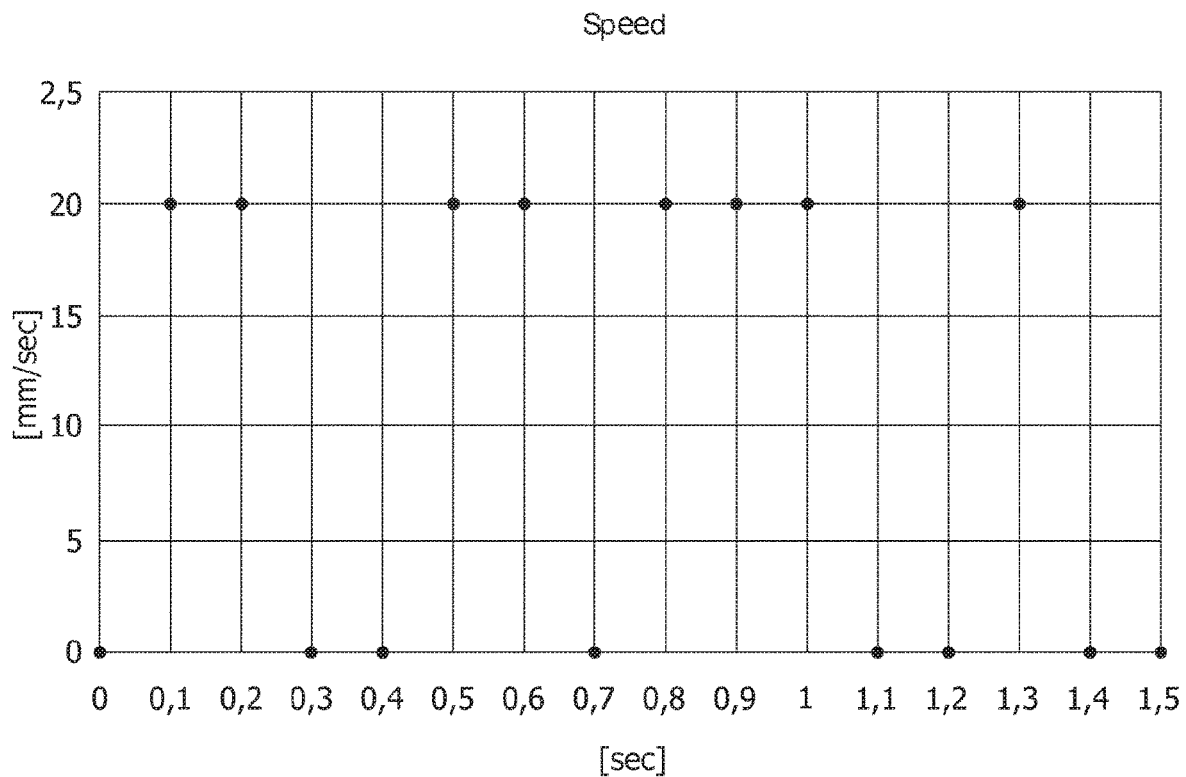
FIG. 2 is a diagram showing an example of an opening cycle of the pin valve according to the invention, in which the upper part of the figure represents the speed/time correlation and the lower part represents the position/time correlation of the pin.
Figure 2:
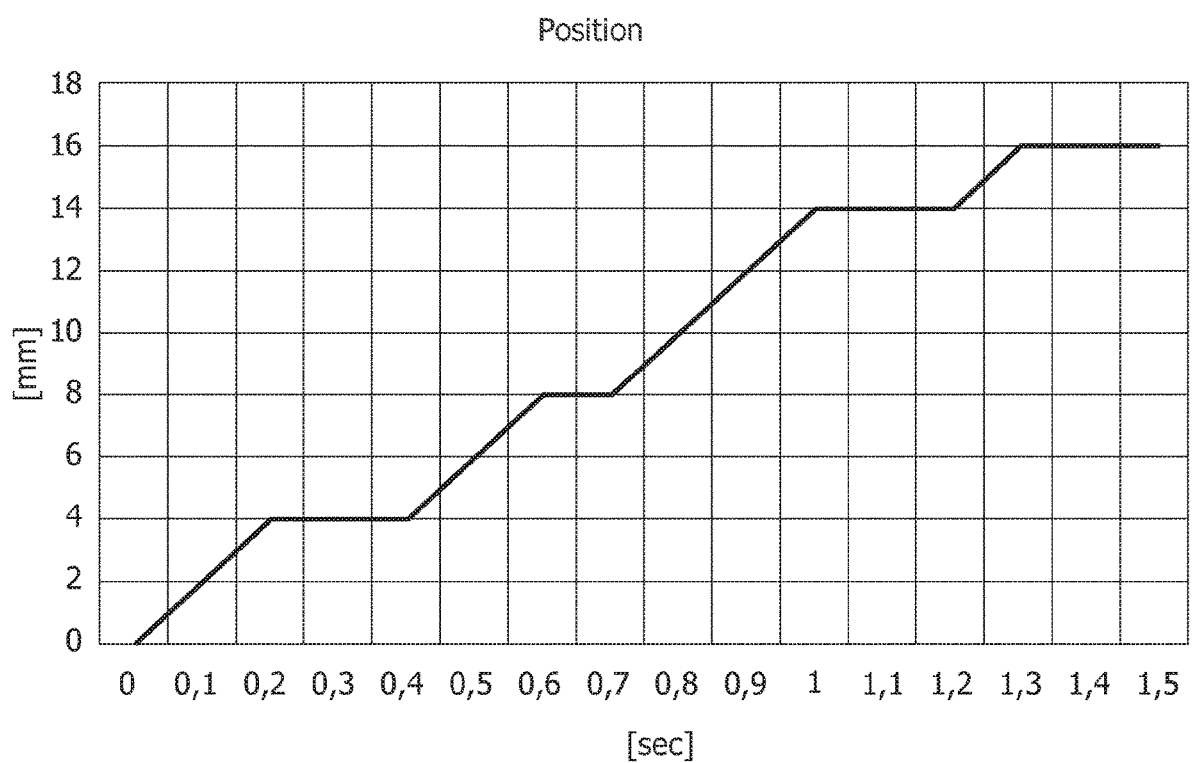

The diagram of FIG. 2 shows an example of an opening cycle according to the invention: the upper part of the diagram represents the speed/time correlation and the lower part represents the position/time correlation of the pin valve 7. As observable, the displacement from the fully closing position to the maximum opening position provides for various steps for stopping the pin valve partial opening intermediate positions, in which the speed thereof is null. The displacement speed of the pin valve between each stop position and the subsequent one, except for acceleration-deceleration transients, is always constant and uniform, and this speed can be programmed by means of the electronic control unit 4.

Figure 3:
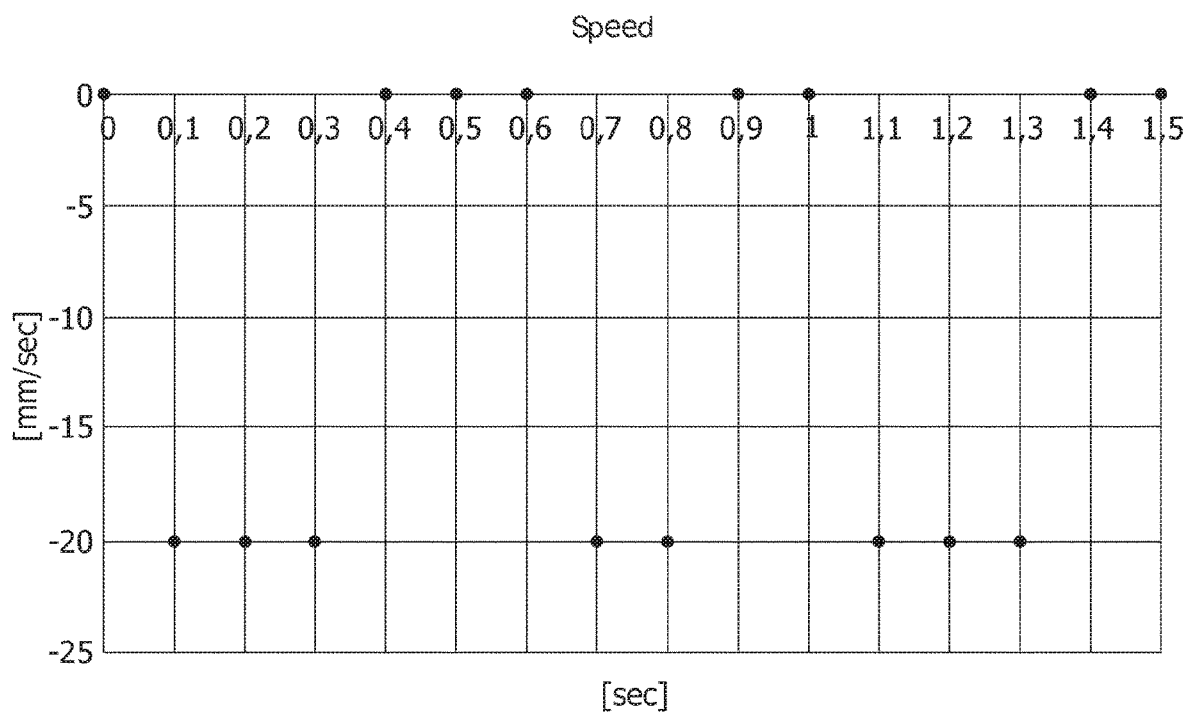
FIG. 3 is a diagram showing an example of a closing cycle of the pin valve according to the invention, in which the upper part of the figure represents the speed/time correlation and the lower part represents the position/time correlation of the pin valve.
Figure 3:
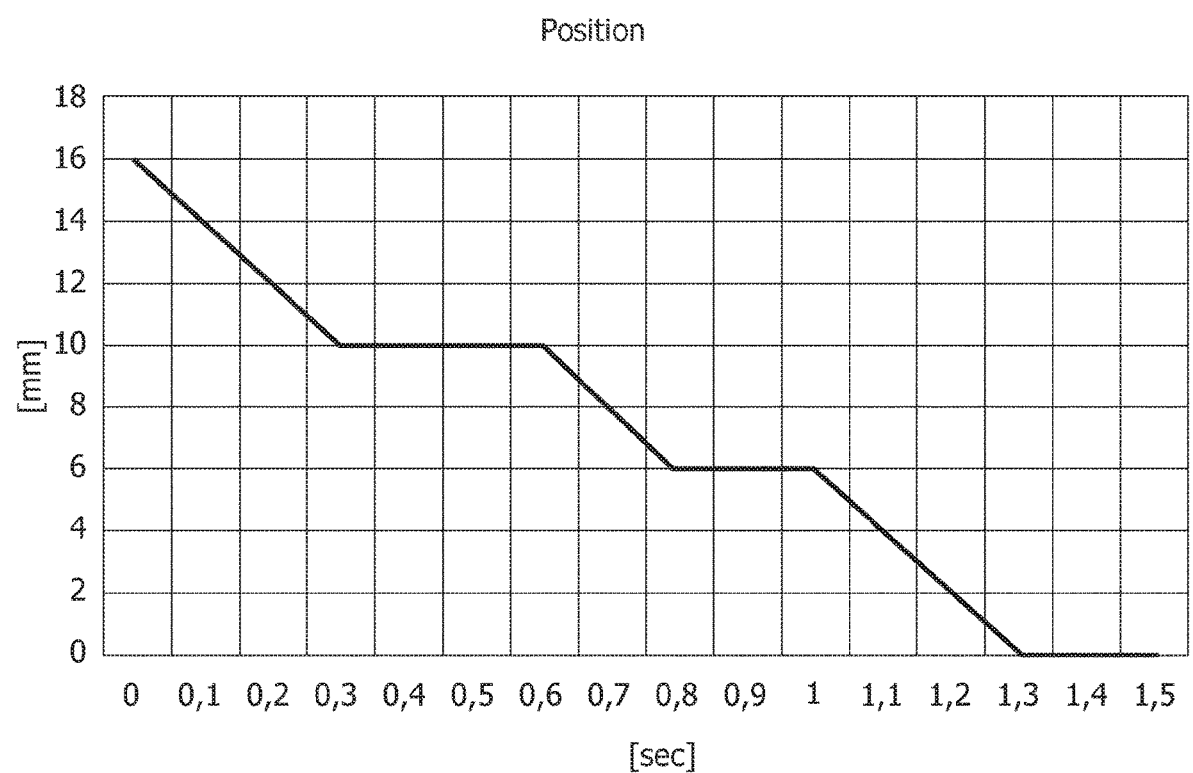

The diagram of FIG. 3 shows an example of a closing cycle according to the invention: also in this case the upper part of the diagram represents the speed/time correlation and the lower part represents the position/time correlation of the pin valve. As observable, the displacement from the maximum opening position to the fully closing position provides for various steps for stopping the pin valve in partial closing intermediate positions, in which the speed thereof is null. The speed of the pin valve between each stop position and the subsequent one is always constant and uniform, and it can also be programmed, i.e. it can be modified whenever deemed necessary, by means of the electronic control unit 4.

For example, the speed in the sections in which the pin valve is being displaced can constantly be in the order of 20 mm/sec. This value, same case applying to the number, the position and the duration of the stop steps of the pin valve may vary depending on the programming mode of the electronic control of the actuator of the injector, whether of the electric or fluid type. Thus, the opening constant and uniform speed may be equal to or different (greater or lesser) from the closing constant and uniform speed. Furthermore, the discontinuous displacement, with constant and uniform displacement speed, of the pin valve may be provided for only in one or in the other of the opening and closing cycles.

It should be observed that the constant and uniform displacement speed between a stop position and the subsequent one, neither considers the transients required for accelerating the pin valve, starting from each position in which the speed thereof is null, until the standard displacement speed thereof is achieved, nor the transients required to decelerate the pin valve up to stopping it in each position in which the speed thereof is null. These transients are to be considered negligible, and thus irrelevant to the effects of the invention and the definition thereof outlined in the claims that follow, considering the extremely short times thereof both with respect to the entire pin valve opening and/or cycle time and with respect to the time interval between each stop and the subsequent one.

FIGS. 4-8 and 9-11 show further alternative examples of speed profiles of the pin valve 7, respectively in opening and closing mode, which fall within the scope of protection of the present invention. In these diagrams, the abscissas indicate the time in seconds or multiples while the ordinates indicate the position of the pin valve in mm. or multiples.

Figure 4:
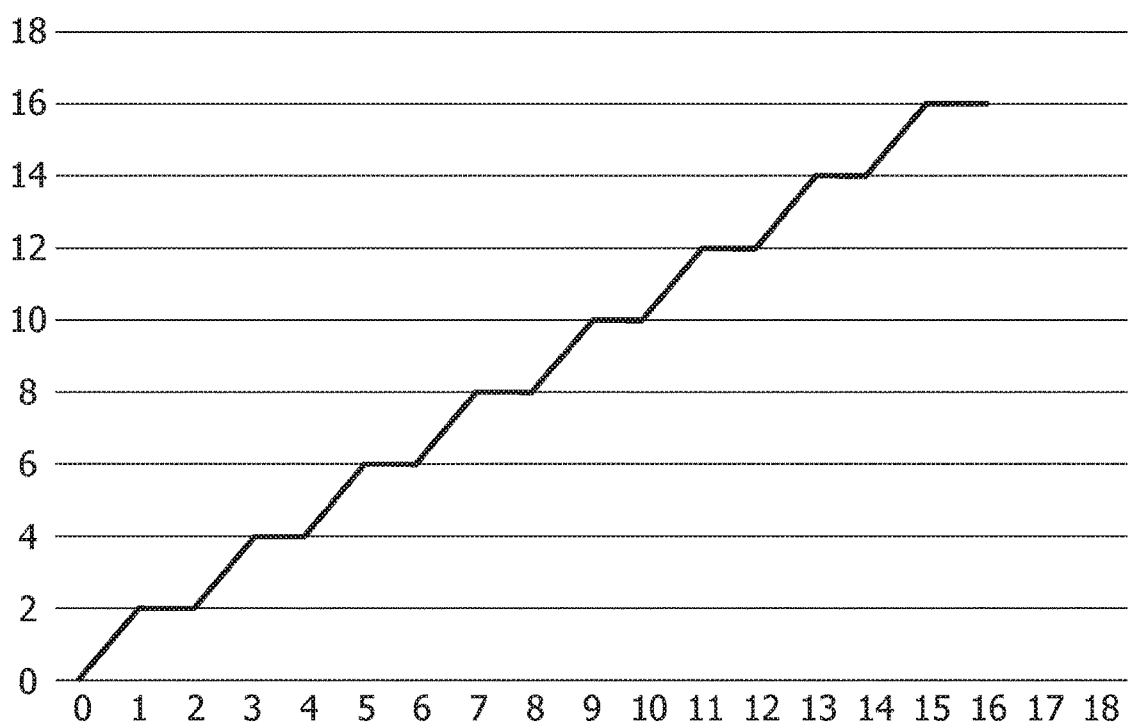
FIGS. 4-8 are diagrams similar to that of the lower part of FIG. 2 showing further examples of opening cycles of the pin valve of the injector according to the invention.
Figure 5:
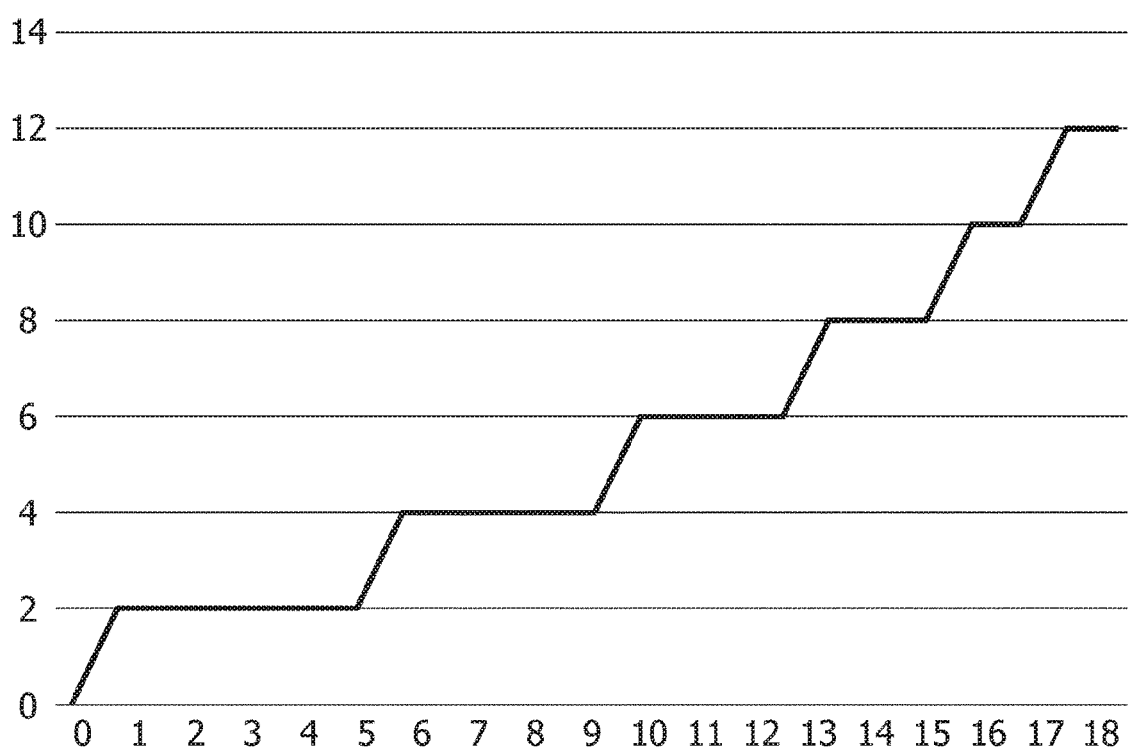

In the profile of FIG. 4 the stop pauses between each displacement of the pin valve at uniform and constant speed have an identical duration, while in the case of FIG. 5 the pauses have a decreasing duration i.e. they shorten progressively towards the maximum opening position.

Figure 6:
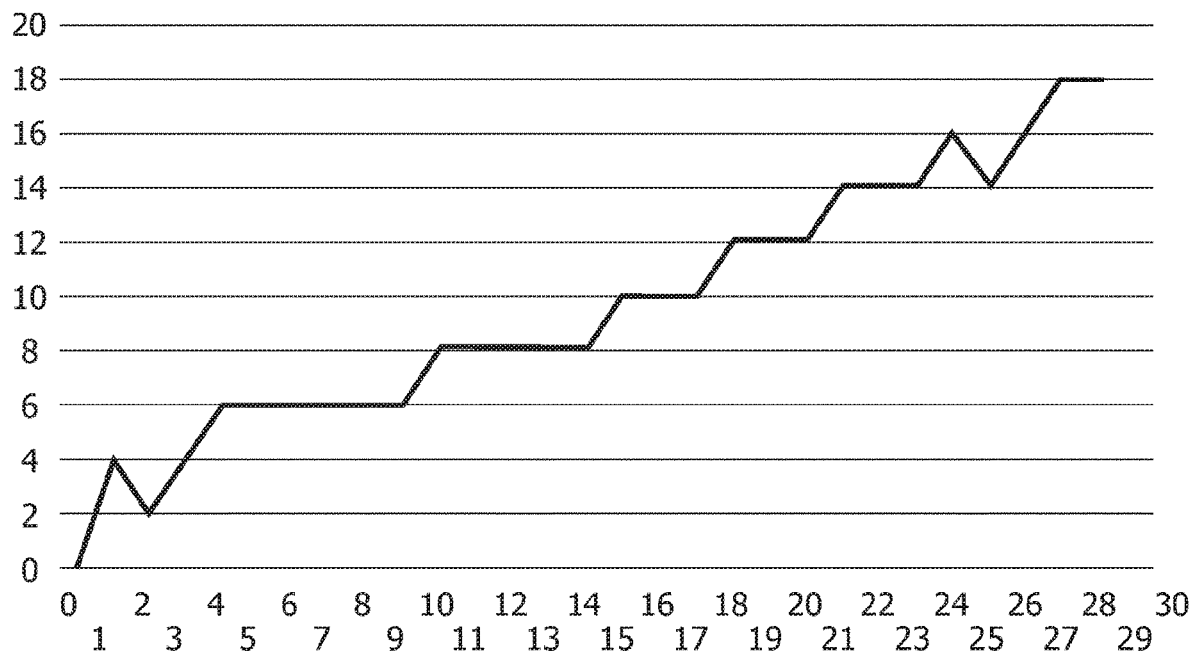

Provided for in the profile of FIG. 6 is a short initial section for the displacement of the pin valve at a speed greater than the uniform and constant speed in the subsequent displacement sections before and after each pause stop. Thus, this initial speed is a maximum opening speed of the pin valve. Also in this case, the duration of the stop pauses of the pin valve decreases towards the maximum opening position.

According to the invention, during the opening cycle using the various modes described above there can also be provided for at least one inversion of the displacement motion of the pin valve, i.e. at least one temporary brief return thereof towards a partial re-closing position. This motion inversion is particularly advantageous should the detection of the position of the pin valve be, like in the case described herein, carried out indirectly by means of the encoder 9 (or equivalent systems), in that this allows to verify and possibly correct the signals regarding the indirect detection of the position of the pin valve 7 transmitted by the encoder 9 of the motor 8 to the electronic control unit 4. In this manner, the precision of the control of the speed of the pin valve becomes considerably more accurate, to the advantage of the quality of the molded articles. Provided for in the case of FIG. 6 are two brief temporary inversion steps respectively in proximity of an initial position and of a final position of the opening or closing stroke of the pin valve, while in the case of FIG. 7 there is provided for a third one at an intermediate position of the opening stroke.

Figure 7:
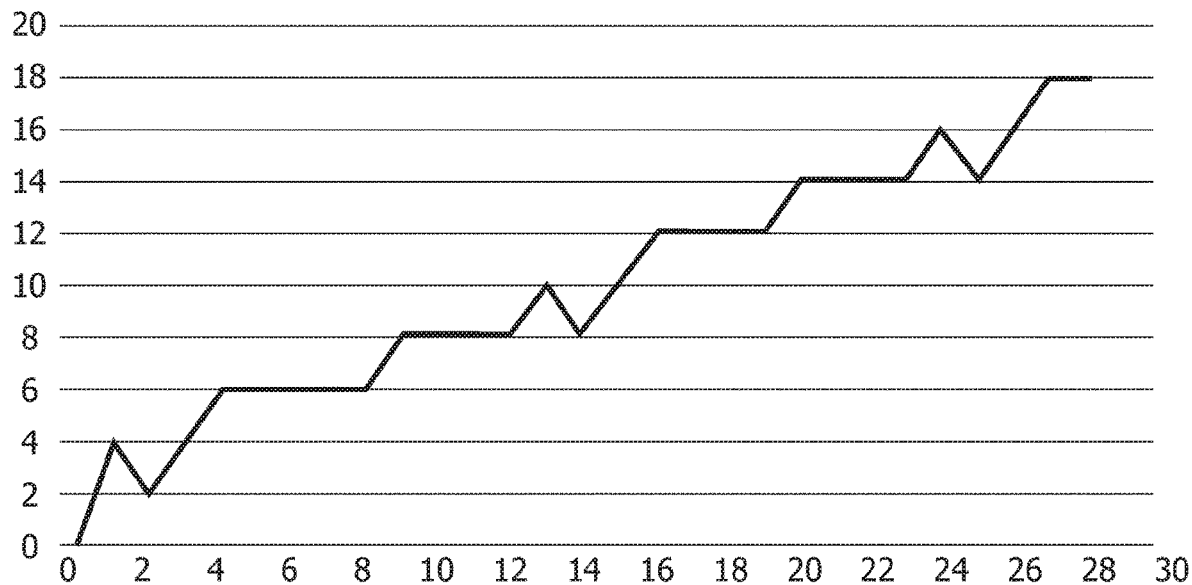
Figure 8:
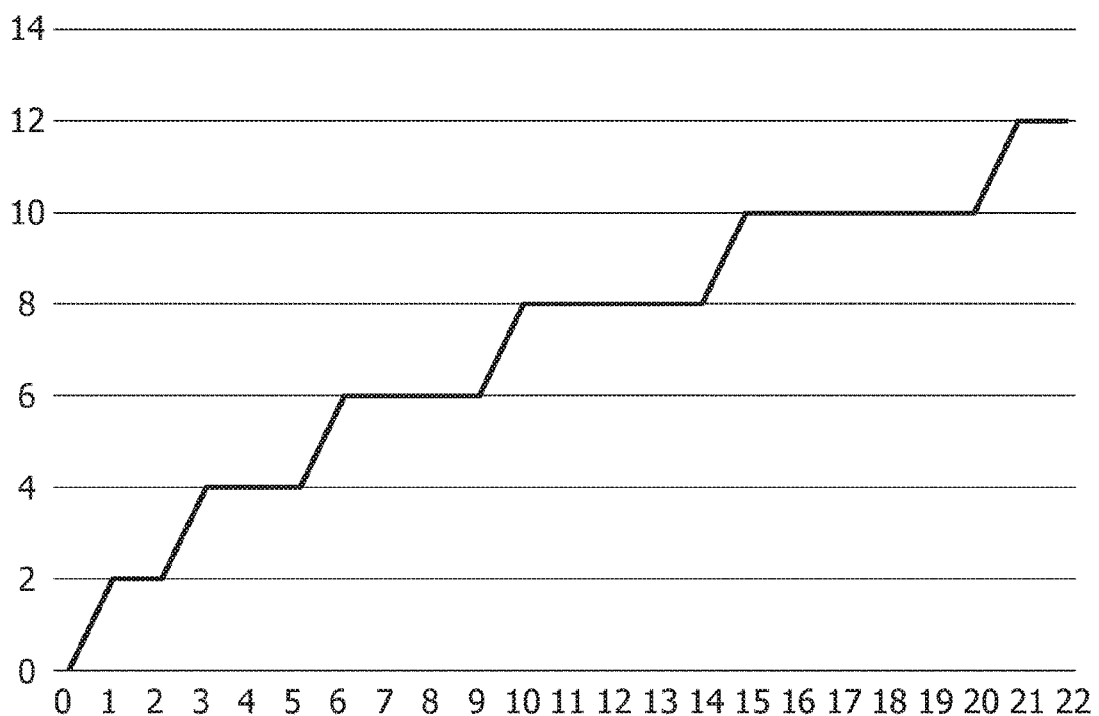

In the profile of FIG. 7 the duration of the stop pauses of the pin valve is also variable and in the profile of FIG. 8 such duration extends towards the maximum opening position.

It should be observed that the profiles described and illustrated herein are provided purely by way of non-limiting example: in particular, any aggregation or combination thereof can be provided, still falling within the scope of protection of the present invention.

Figure 9:
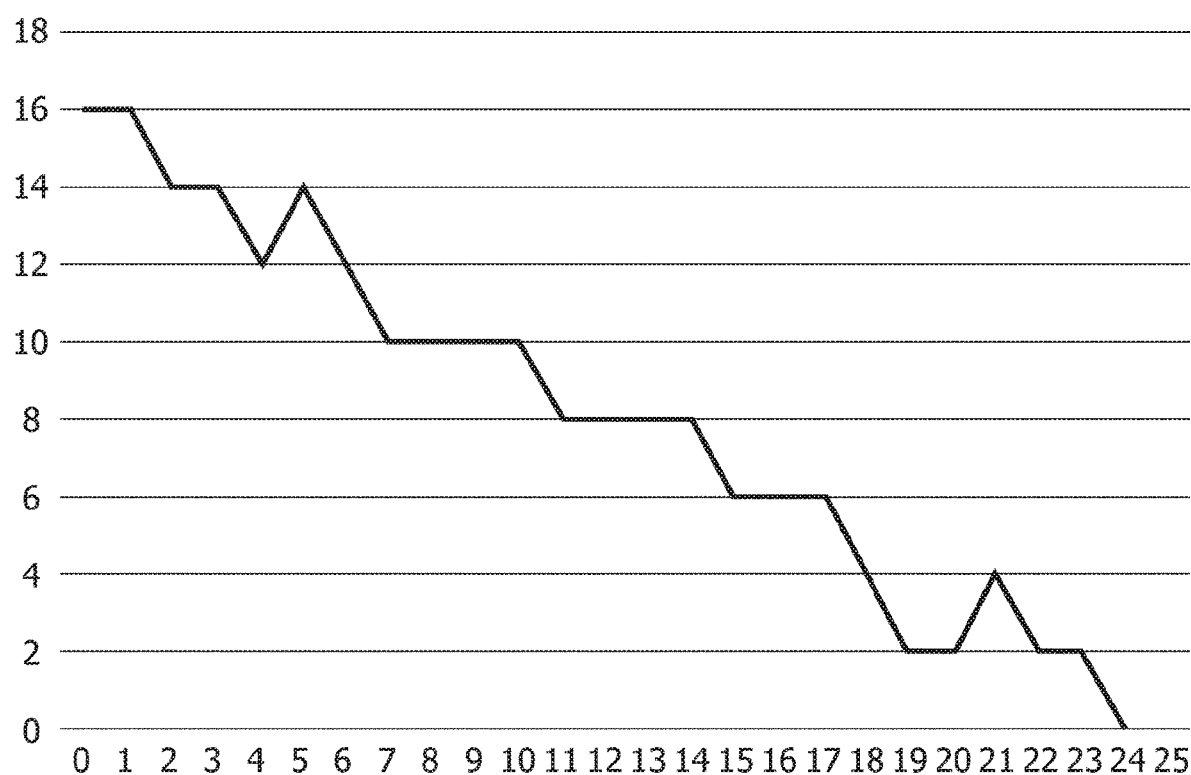
FIGS. 9-11 are diagrams similar to that of the lower part of FIG. 3 showing further examples of closing cycles of the pin valve of the injector according to the invention.
Figure 10:
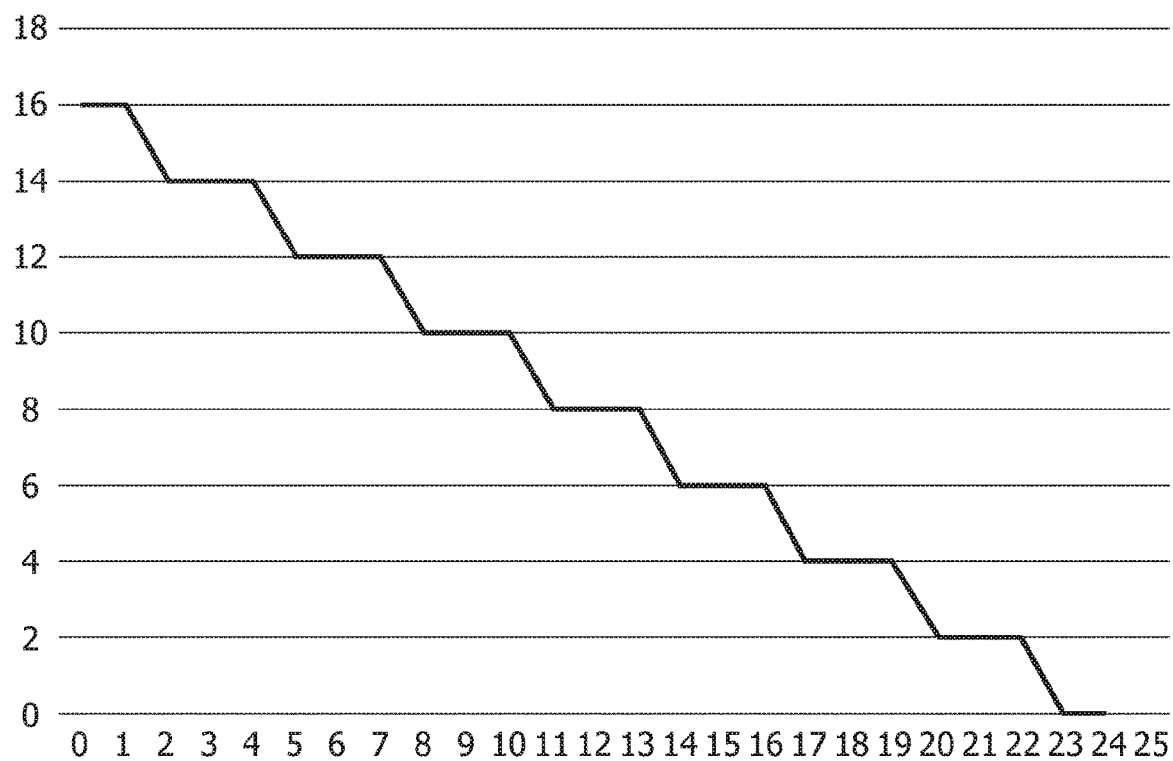
Figure 11:
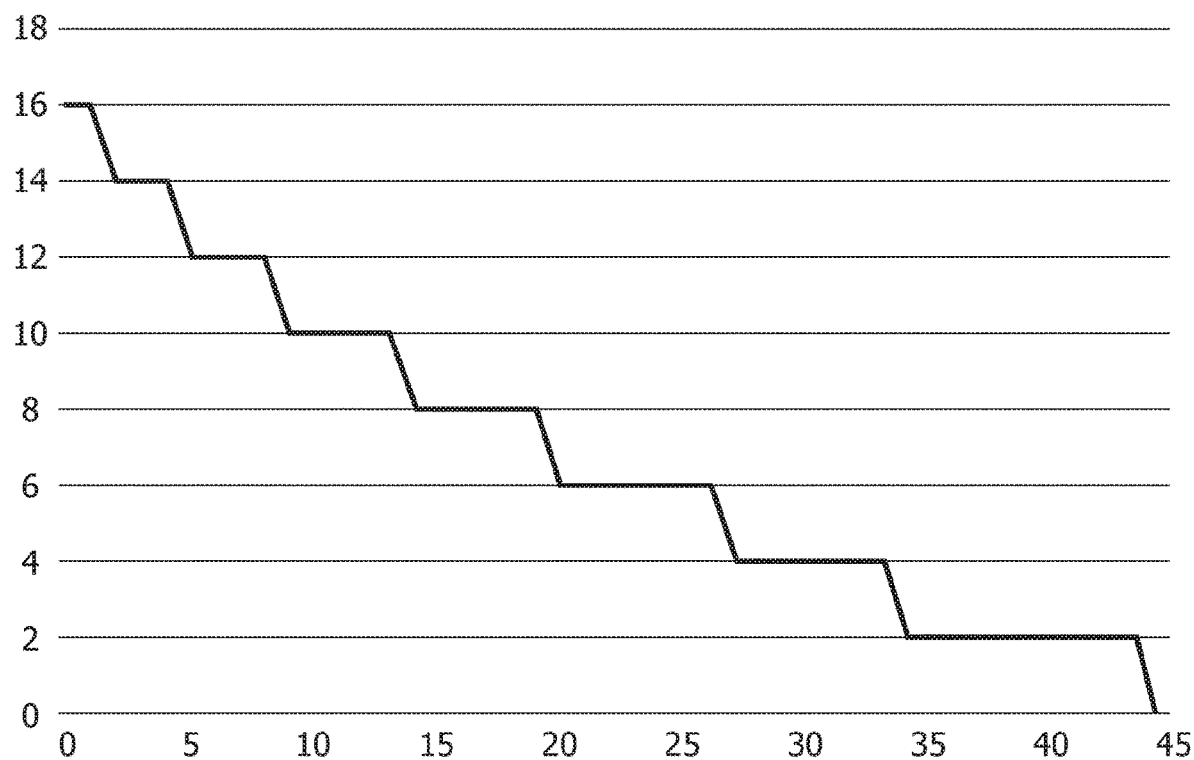

The same operating modes described above can be provided for in the closing displacement of the pin valve which, besides being discontinuous, has a uniform and constant displacement speed between the stop pauses, whose duration can be equal or different. Also one or more steps for the temporary and brief return to a partial opening position can be contemplated. Thus, the closing profile represented in FIG. 9 provides for variable pauses and motion inversion respectively in proximity of the initial maximum open position and the final fully closed position. The profiles of FIGS. 10 and 11 on the contrary do not provide for any inversion and the duration of the stops between each displacement section at uniform and constant speed is respectively equal or different, in particular it increases towards the fully closing position.

The stop times of the pin valve during the closing and/or opening displacement can be conveniently variable according to a mathematical function referred to the internal conditions of the mold: for example, the duration of the stop can be proportional to the injection pressure in the various points of the mold and/or to the flow rate of the injected material.

As previously clarified, the opening and closing profiles of the pin valve can be configured independently from each other. Furthermore, they can have, the one or the other, conventional profiles for example of the constant and continuous speed type.

Obviously, the construction details and the embodiments of the apparatus and the relative injector described herein with reference to the exemplifying embodiment may widely vary without departing from the scope of protection of the present invention as described in the claims that follow. Thus, though the invention has been described with reference to an electrical actuation of the injector, it can also be advantageously applied to the case of fluid actuators, for example pneumatic, with electronic control. In such case, the indirect detection of the position of the pin valve may be obtained by means of a linear encoder. Direct detection of the position of the pin valve—obtained by means of a linear encoder, a Hall effect magnetic sensor, an optical sensor or equivalent systems—can also be envisaged both in the case of fluid actuators and in the case of electric motors.

The invention claimed is:

1. A method for injection molding of plastic material into a mold cavity by means of at least one injector including a pin valve displaceable between a fully closed position and a maximum open position and vice versa, wherein the pin valve is operated by an actuator in a controlled fashion in connection with a position and speed of the pin valve between said fully closed and maximum open positions and wherein during displacement from the fully closed position to the maximum open position, the pin valve is stopped in a plurality of partial opening intermediate positions and a displacement speed of the pin valve between said plurality of partial opening intermediate positions is uniform and constant.

2. The method according to claim 1, wherein during the displacement from the maximum open position to the fully closed position, the pin valve is stopped in a plurality of partial closing intermediate positions and the displacement speed of the pin valve between said plurality of partial closing intermediate positions is uniform and constant.

3. The method according to claim 1, wherein the displacement of the pin valve provides for at least one step of inversion of motion thereof.

4. The method according to claim 2, wherein the uniform and constant displacement speed during displacement from the fully closed position to the maximum open position is equal to the uniform and constant displacement speed during displacement from the maximum open position to the fully closed position.

5. The method according to claim 2, wherein the uniform and constant displacement speed during displacement from the fully closed position to the maximum open position is different from the uniform and constant displacement speed during displacement from the maximum open position to the fully closed position.

6. The method according to claim 1, wherein said uniform and constant displacement speed of the pin valve can be modified.

7. The method according to claim 1, wherein an initial opening speed of the pin valve starting from the fully closed position up to a first stop in a partial opening intermediate position of the plurality of partial opening intermediate positions is different and greater than said uniform and constant displacement speed.

8. The method according to claim 1, wherein a time the pin valve is stopped in the plurality of partial opening or closing intermediate positions has a constant duration.

9. The method according to claim 1, wherein a time the pin valve is stopped in the plurality of partial opening or closing intermediate positions has a variable duration.

10. The method according to claim 9, wherein a time the pin valve is stopped in the plurality of partial opening intermediate positions during the opening displacement thereof reduces progressively towards the maximum open position.

11. The method according to claim 9, wherein a time the pin valve is stopped in the plurality of partial opening intermediate positions during the opening displacement thereof extends progressively towards the maximum open position.

12. The method according to claim 9, wherein a time the pin valve is stopped in the plurality of partial closing intermediate positions during closing displacement thereof increases progressively towards the maximum open position.

13. The method according to claim 9, wherein a time the pin valve is stopped in the plurality of partial closing and/or opening intermediate positions during the closing and/or opening displacement is variable according to a mathematical function referring to internal conditions of the mold, including injection pressure and/or injected material flow rate.

14. An apparatus for injection molding of plastic materials, comprising:
   at least one injector having a pin valve displaceable between a fully closed position and a maximum open position,
   wherein said pin valve is actuated by an electrical or pneumatic actuator and associated sensor for direct or indirect detection of a position of the pin valve,
   wherein an electronic unit operatively connected to said sensor controls operation of an electric motor and/or pneumatic cylinder, and
   wherein said electronic unit is configured to carry out the method according to claim 2.

15. The apparatus according to claim 14, wherein said motor is a rotary or linear electric motor and said sensor is a rotary or linear encoder, or a Hall effect magnetic sensor, or an optical sensor.

16. A method for controlling an injector of an apparatus for injection molding of plastic materials wherein said injector includes a pin valve displaceable from a fully closing position and a maximum opening position and vice versa, and wherein the pin valve is operated by an actuator in a controlled fashion in connection with a position and speed thereof, the method comprising:
   during a displacement of the pin valve from the fully closing position to the maximum opening position, the pin valve is stopped in a plurality of partial opening intermediate positions,
   during the displacement of the pin valve from the maximum opening position to the fully closing position, the pin valve is stopped in a plurality of partial closing intermediate positions, and
   wherein an opening displacement speed and a closing displacement speed of the pin valve between said plurality of partial opening intermediate positions and said plurality of partial closing intermediate positions are uniform and constant.

17. The method according to claim 16, wherein the displacement of the pin valve provides for at least one step of inversion of motion thereof.

18. The method according to claim 17, wherein the displacement of the pin valve provides for a plurality of steps of inversion of the motion thereof.

19. The method according to claim 18, wherein the displacement of the pin valve provides for an initial step, an intermediate step and a final step of inversion of the motion thereof.

20. The method according to claim 16, wherein an initial opening speed of the pin valve starting from the fully closing position up to a first stop in a partial opening position of the plurality of partial opening intermediate positions is different and greater than the uniform and constant displacement speed.

21. The method according to claim 16, wherein a time the pin valve is stopped in the plurality of partial opening or closing intermediate positions has a constant duration.

22. The method according to claim 16, wherein a time the pin valve is stopped in the plurality of partial opening or closing intermediate positions has a variable duration.

23. The method according to claim 22, wherein a time the pin valve is stopped in the plurality of partial opening intermediate positions during the opening displacement thereof shortens progressively towards the maximum opening position.

24. The method according to claim 22, wherein a time the pin valve is stopped in the plurality of partial opening intermediate positions during the opening displacement thereof increases progressively towards the maximum opening position.

25. The method according to claim 22, wherein a time the pin valve is stopped in the plurality of partial closing intermediate positions during closing displacement thereof increases progressively towards the fully closing position.

* * * * *